(12) United States Patent
Orlandini

(10) Patent No.: US 12,429,382 B2
(45) Date of Patent: Sep. 30, 2025

(54) TEMPERATURE SENSING AND INDICATION FOR FOODSTUFF

(71) Applicant: Insight Direct USA, Inc., Tempe, AZ (US)

(72) Inventor: Juan M. Orlandini, Roswell, GA (US)

(73) Assignee: Insight Direct USA, Inc., Chandler, AZ (US)

( * ) Notice: Subject to any disclaimer, the term of this patent is extended or adjusted under 35 U.S.C. 154(b) by 612 days.

(21) Appl. No.: 17/846,737

(22) Filed: Jun. 22, 2022

(65) Prior Publication Data

US 2023/0417601 A1 Dec. 28, 2023

(51) Int. Cl.
| | |
|---|---|
| *G01K 1/024* | (2021.01) |
| *G01K 3/00* | (2006.01) |
| *G01K 3/10* | (2006.01) |
| *G01K 7/04* | (2006.01) |
| *G01K 7/16* | (2006.01) |
| *H04L 67/12* | (2022.01) |
| *H04W 4/38* | (2018.01) |

(52) U.S. Cl.
CPC .............. *G01K 1/024* (2013.01); *G01K 3/005* (2013.01); *G01K 3/10* (2013.01); *G01K 7/04* (2013.01); *G01K 7/16* (2013.01); *G01K 2207/06* (2013.01); *H04L 67/12* (2013.01); *H04W 4/38* (2018.02)

(58) Field of Classification Search
CPC .......... G01K 1/024; G01K 3/005; G01K 3/10; G01K 7/04; G01K 7/16; G01K 2207/06; H04L 67/12; H04W 4/38
See application file for complete search history.

(56) References Cited

U.S. PATENT DOCUMENTS

| | | | |
|---|---|---|---|
| 6,539,842 B1 | 4/2003 | Chapman et al. | |
| 7,566,168 B2 | 7/2009 | Rund et al. | |
| 8,931,400 B1* | 1/2015 | Allen | A47J 37/0786 |
| | | | 99/344 |
| 9,672,721 B2 | 6/2017 | Jeong | |
| 10,025,282 B1 | 7/2018 | Wilkinson | |
| 10,194,770 B2 | 2/2019 | Young et al. | |
| 10,732,054 B2 | 8/2020 | Calhoun et al. | |
| 2017/0195542 A1 | 7/2017 | Thomas et al. | |
| 2021/0035173 A1* | 2/2021 | Nandwana | G06Q 30/0613 |
| 2022/0117438 A1 | 4/2022 | Lion et al. | |
| 2023/0160753 A1* | 5/2023 | Mirza | G01K 1/14 |
| | | | 374/142 |
| 2023/0245547 A1* | 8/2023 | Carr | G01K 1/024 |
| | | | 340/517 |

* cited by examiner

*Primary Examiner* — Randy W Gibson

(74) *Attorney, Agent, or Firm* — Kinney & Lange, P.A.

(57) ABSTRACT

A temperature sensing and indication system generates information regarding the temperature of a foodstuff and provides an indication of the temperature by an Internet of Things (IoT) device. A transceiver receives temperature data from a temperature sensor and transmits the temperature data to a cloud platform. A controller downloads the temperature data from the cloud platform and generates cook status data based on the temperature data. The controller generates and transmits instructions to an IoT device to cause the IoT device to output an indication of the cook status of the foodstuff.

17 Claims, 3 Drawing Sheets

TEMPERATURE SENSING AND INDICATION FOR FOODSTUFF

BACKGROUND

The present disclose relates generally to cooking of foodstuffs. More specifically, this disclosure relates to temperature sensing and indication for cooking foodstuffs.

The heating of various foodstuffs, such as meats (e.g., beef, pork, poultry, fish, etc.), can be of critical importance to the cooking process. The internal temperature of the foodstuff is important to various aspects of the cooking process. The internal temperature is often indicative of the degree to which the foodstuff is cooked. The United States Department of Agriculture (USDA) has established food safety guidelines at which it considers various foodstuffs to be cooked to a sufficient level so as to be safe for human consumption. The internal temperature can also be used to control certain characteristics of the cooked foodstuff. For example, pork butt is often heated to internal temperature approaching or exceeding 190-degrees Fahrenheit (F) (about 37.8 degrees Celsius (C)) before pulling the meat into a final form for consumption.

Various cooking processes (e.g., smoking, grilling, barbeque, roasting, baking, etc.) can take many hours for the internal temperature to rise to a target temperature that provides food characteristics desired by the cook. The cooking processes can also include inflection points that trigger the cook to take some action (e.g., wrapping the meat in metallic foil, applying a sauce, removing the meat from heat, adjusting a temperature of the heat source, etc.). The inflection points are often determined based on the internal temperature. The long cook times and inflection points create a need to provide a system that provides the user with information regarding the internal temperature during the cooking process, such that the user does not need to directly monitor the cooking process.

Currently, temperature monitoring systems include thermometers that provide the internal temperature to a dedicated remote device that displays the internal temperature to the user.

SUMMARY

According to one aspect of the disclosure, a food temperature measurement (FTM) system includes an Internet of Things (IoT) device; a temperature sensor configured to generate temperature reading data regarding an internal temperature of a foodstuff; a transceiver communicatively connected to the temperature sensor to receive the temperature reading data from the temperature sensor and transmit sensed temperature data to a cloud platform, the sensed temperature data based on the temperature reading data; and a controller communicatively connected to the cloud platform to receive temperature status data from the cloud platform, the temperature status data based on the sensed temperature data. The controller includes control circuitry; and computer-readable memory storing instructions that, when executed by the control circuitry, cause the controller to compare the temperature status data to a first temperature threshold to determine a cook status; generate a first status signal based on the determined cook status; and transmit the first status signal to the IoT device to cause the IoT device to emit a first status indicator regarding a cooking state of the foodstuff.

According to an additional or alternative aspect of the disclosure, a food temperature measurement (FTM) system including an Internet of Things (IoT) device; a temperature sensor configured to generate temperature reading data regarding a temperature of a foodstuff; a transceiver communicatively connected to the temperature sensor to receive the temperature reading data from the temperature sensor, the transceiver configured to transmit sensed temperature data to a cloud platform, the sensed temperature data based on the temperature reading data; and a controller communicatively connected to the cloud platform to receive temperature status data from the cloud platform, the temperature status data based on the sensed temperature data. The controller includes control circuitry; and computer-readable memory storing instructions that, when executed by the control circuitry, cause the controller to compare the temperature status data to a plurality of temperature thresholds; generate cook status data based on the comparison of the temperature status data and the plurality of thresholds; generate a status signal based on the cook status data; and transmit the first status signal to the IoT device to cause the IoT device to emit a status indicator regarding a cooking state of the foodstuff. The controller is configured to cause the IoT device to output a unique status indicator based on each threshold of the plurality of thresholds.

According to another additional or alternative aspect of the disclosure, a method of determining a cooking state of a foodstuff and providing information regarding the cooking state includes generating, by a temperature sensor, temperature reading data regarding a temperature of the foodstuff; receiving, at a transceiver, the temperature reading data from the temperature sensor; transmitting, by the transceiver, sensed temperature data to a cloud platform, the sensed temperature data based on the temperature reading data; receiving, at a controller, temperature status data from the cloud platform, the temperature status data based on the sensed temperature data; comparing, by the controller, the temperature status data to a temperature threshold and determining a cook status based on the comparison; generating, by the controller, a status signal based on the determined cook status; transmitting, by the controller, the status signal to an Internet of Things (IoT) device; and emitting, by the IoT device, a status indicator regarding the cooking state of the foodstuff.

DETAILED DESCRIPTION

The present disclosure is directed to a system for monitoring the temperature of a foodstuff during the cooking process and providing alerts to a user regarding the cook status of the foodstuff. Temperature data is generated for the foodstuff and transmitted to a cloud computing platform. A controller recalls the temperature data and monitors the internal temperature of the foodstuff based on the temperature data. The controller generates and provides commands to a discrete device that cause the discrete device to output cook status information to the user. The controller causes the discrete device to output different indicators based on the controller determining different cook statuses for the foodstuff.

Figure 1A:
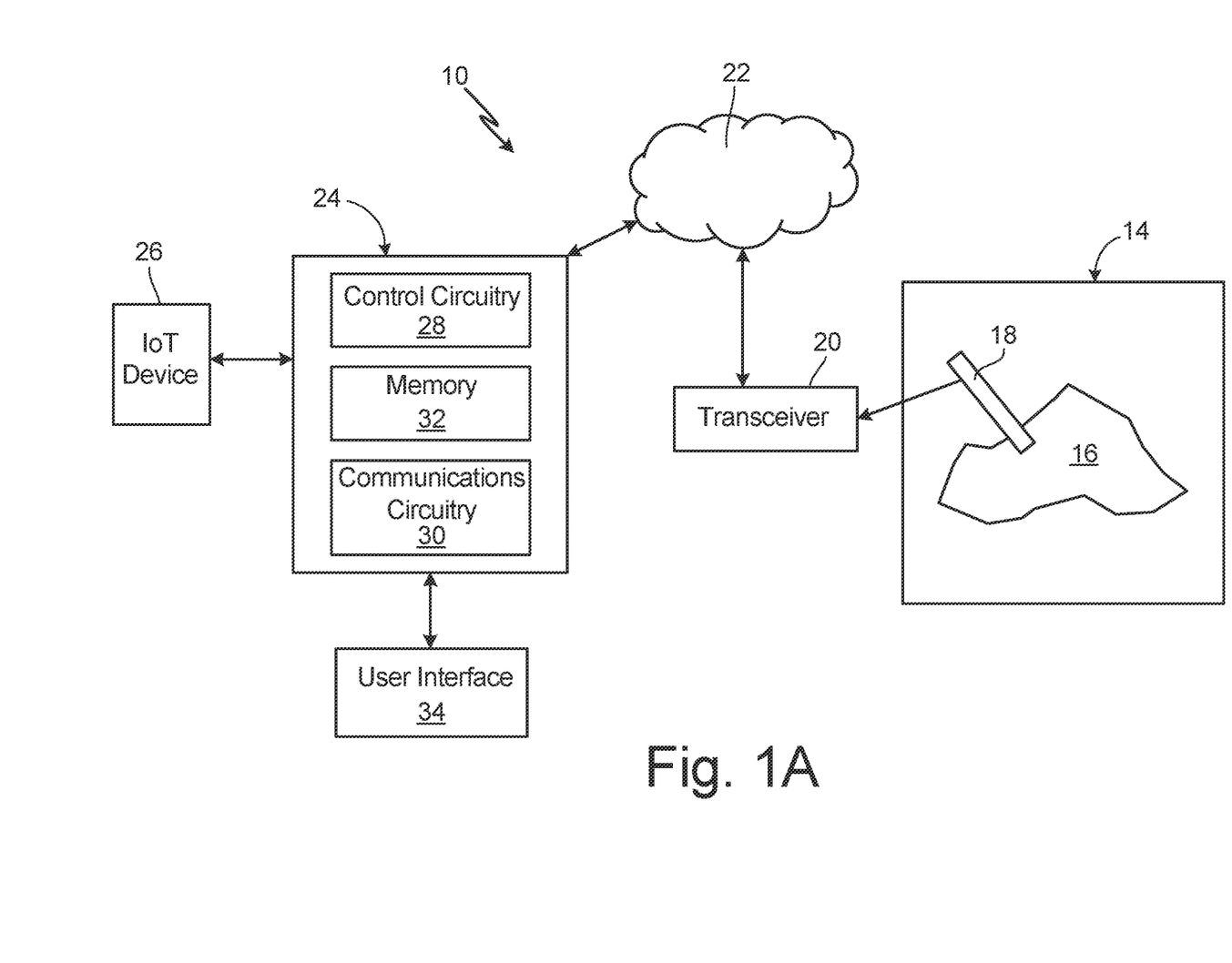
FIG. 1A is a block diagram illustrating a food temperature monitoring system.
Figure 1B:
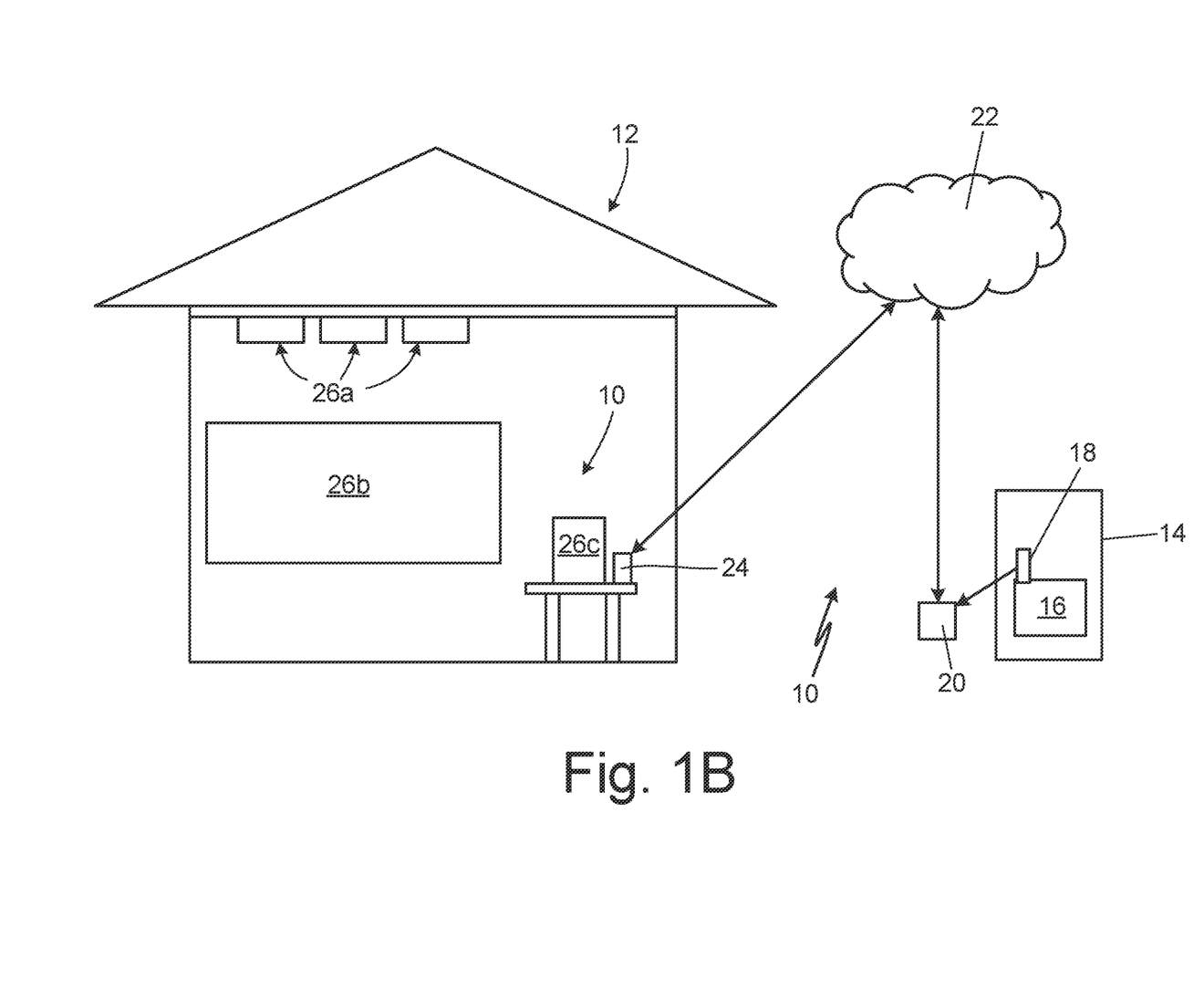
FIG. 1B is a block diagram illustrating a food temperature monitoring system in a home environment.

FIG. 1A is a schematic block diagram illustrating a food temperature monitoring (FTM) system 10. FIG. 1B is a block diagram illustrating FTM system 10 in a home environment 12. FIGS. 1A and 1B are discussed together. FTM system 10, cooking device 14, and foodstuff 16 are shown. FTM system 10 includes temperature sensor 18, transceiver 20, cloud platform 22, system controller 24, and Internet of Things (IoT) devices 26a-26c (collectively herein "IoT device 26" or "IoT devices 26"). System controller 24 includes control circuitry 28, communications circuitry 30, memory 32, and user interface 34.

FTM system 10 is a system configured to generate cook status information regarding the internal temperature of foodstuff 16 and provide such cook status information to the user. FTM system 10 displays indicators to the user regarding a cook status of the foodstuff 16. The cook status is based on the internal temperature of the foodstuff 16.

Cooking device 14 can be of any desired configuration for heating the foodstuff 16 and increasing an internal temperature of the foodstuff 16 (e.g., smoker, grill, oven, etc.). In an exemplary embodiment, the foodstuff 16 is a meat (e.g., beef, pork, poultry, etc.), though it is understood that foodstuff 16 can be any desired foodstuff for which the user wants to track the internal temperature during the cooking process. Various cooking processes (e.g., smoking, grilling, barbeque, roasting, baking, etc.) can take many hours for the internal temperature to rise to a target temperature that provides food characteristics desired by the cook. The cooking processes can also include inflection points that trigger the cook to take some action (e.g., wrapping the meat in metallic foil, applying a sauce, removing the meat from heat, adjusting a temperature of the heat source, etc.). The inflection points are often determined based on the internal temperature. Some foodstuffs 16 (e.g., beef and pork) encounter a period during cooking that is referred to as a "stall." During the stall, the internal temperature of the foodstuff 16 stops rising or may even drop for several hours. The stall occurs due to evaporative cooling due to the foodstuff 16 "sweating" out excess moisture that then evaporates from a surface of the foodstuff 16. The stall period can last for several hours. The foodstuff 16 is considered to exit the stall when the internal temperature of the foodstuff 16 begins rising again.

Temperature sensor 18 is configured to generate temperature reading data regarding a temperature of interest. In the example shown, temperature sensor 18 is connected to foodstuff 16 to generate temperature reading data regarding the internal temperature of the foodstuff 16. For example, temperature sensor 18 can include a probe that extends into the foodstuff 16. It is understood, however, that other examples of FTM system 10 can include more than one temperature sensor 18. In some examples, FTM system 10 is configured to generate data regarding more than one temperature of interest. For example, a first temperature sensor 18 can be associated with the foodstuff 16 to generate temperature reading data regarding the internal temperature, a second temperature sensor 18 can be associated with an exterior (e.g., environmental) temperature. The second temperature sensor 18 can be associated with the temperature within the cooking device 14, the temperature of the air around the cooking device 14, etc.

Temperature sensor 18 can be of any configuration suitable for generating this temperature reading data, such as one or more of a thermocouple, thermistor, infrared thermometer, etc. Temperature sensor 18 can be configured to generate analog temperature reading data. For example, temperature sensor 18 can be configured to generate the temperature reading data based on a resistance measurement of dissimilar metallic wires in the temperature sensor 18. While temperature sensor 18 is described as generating temperature reading data based on a resistance measurement, it is understood that temperature sensor 18 can be of any configuration suitable for generating information regarding the internal temperature of foodstuff 16.

Transceiver 20 is communicatively connected to temperature sensor 18. For example, transceiver 20 can be connected to temperature sensor 18 by a wired or wireless connection. Transceiver 20 is communicatively connected to temperature sensor 18 to receive the temperature reading data from temperature sensor 18. In some examples, transceiver 20 includes general purpose input/output pins that facilitate intake of the analog signal from temperature sensor 18. In the example shown, transceiver 20 includes a conversion module that is configured to convert the analog temperature data to digital temperature data. The digital temperature data can also be referred to as sensed temperature data.

Transceiver 20 is communicatively connected to cloud platform 22. Cloud platform 22 is formed by one or more interconnected computing devices such as server devices, mainframe computers, or other computing devices capable of storing and accessing information and/or distributing functional operations of, e.g., an application or service among the various connected devices. Cloud platform 22 is remote from FTM system 10 and communicatively coupled to components of FTM system 10 via one or more wireless communication networks, such as cellular networks, wide area networks (WANs) such as the Internet, local area networks (LANs), wireless local area networks (WLANs), or other types of networks. Cloud platform 22 can include machine-readable data storage capable of retrievably storing data, such as temperature data.

The digital temperature data can be communicated to cloud platform 22 utilizing a "push" protocol, in which the digital temperature data is communicated to cloud platform 22 without a query or request from cloud platform 22. The digital temperature data can be communicated to cloud platform 22 utilizing a "pull" protocol, in which the digital temperature data is communicated to cloud platform 22 in response to a query or request from cloud platform 22.

In some examples, transceiver 20 is configured to provide the digital temperature data to cloud platform 22 at intervals. For example, transceiver 20 can be configured to provide sensed temperature data to cloud platform 22 at regular intervals, such as every 5 seconds, 1 second, 0.5 seconds, 0.1 seconds, or at intervals of more or less time as desired. In such examples, transceiver 20 can be considered to stream the sensed temperature data to cloud platform 22. The sensed temperature data is stored on cloud platform 22 as temperature status data.

The temperature status data can provide an aggregation of the historic internal temperature readings of foodstuff 16. For example, the temperature status data can be configured as time series data plotting the internal temperature curve of foodstuff 16 over time. In some examples, cloud platform 22 is configured to chart the temperature status data as the time series data. As noted above, the cooking process can vary for each foodstuff, including between different ones of the same foodstuff 16 (e.g., each one of a single cut of meat can hit different temperature set points at different times and at different rates of change). The time series data provides an indication of the cooking history of the particular foodstuff 16 being monitored and can facilitate individualized control of the cooking process for each foodstuff 16 cooked.

Controller 24 is communicatively coupled to cloud platform 22. Controller 24 is communicatively connected to cloud platform 22 to receive the temperature status data from cloud platform 22. In some examples, cloud platform 22 is configured to communicate the temperature status data utilizing a "push" protocol. In additional or alternative examples, cloud platform 22 is configured to communicate the temperature status data utilizing a "pull" protocol. In some examples, controller 24 can receive the temperature status data from cloud platform 22 at regular intervals. In some examples, controller 24 can be considered to receive a stream of the temperature status data from cloud platform 22 (e.g., as an interrupted (periodic) or uninterrupted stream).

Controller 24, which can also be referred to as a computing device, is configured to determine the cook status of foodstuff 16 during the cooking process. Controller 24 is configured to generate data and information regarding the internal temperature of foodstuff 16 and output signals indicative of the cook status of foodstuff 16. Controller 24 is configured to store software, implement functionality, and/or process instructions. Controller 24 can be of any suitable configuration for gathering data, processing data, etc. Controller 24 can receive inputs, provide outputs, determine a cook status, and output information regarding the cook status. Controller 24 can be configured to receive inputs and/or provide outputs via user interface 34. Controller 24 can include hardware, firmware, and/or stored software, and controller 24 can be entirely or partially mounted on one or more circuit boards. In some examples, controller 24 is formed as a single board computer (SBC). In one example, controller 24 is formed by a Raspberry Pi®.

While controller 24 is shown as a discrete assembly, it is understood that controller 24 can be formed by one or more devices capable of individually or collectively implementing functionalities and generating and outputting data as discussed herein. Controller 24 can be considered to form a single computing device even when distributed across multiple component devices. Controller 24 is configured to perform any of the functions attributed herein to controller 24, including receiving an output from any source referenced herein, detecting any condition or event referenced herein, and generating and providing data and information as referenced herein. Controller 24 can be of any type suitable for operating in accordance with the techniques described herein. In some examples, controller 24 can be implemented as a plurality of discrete circuitry subassemblies. In some examples, controller 24 can include a smartphone or tablet, among other options.

Control circuitry 28, in one example, is configured to implement functionality and/or process instructions. For example, control circuitry 28 can be capable of processing instructions stored in memory 32. Examples of control circuitry 28 can include one or more of a processor, a microprocessor, a controller, a digital signal processor (DSP), an application specific integrated circuit (ASIC), a field-programmable gate array (FPGA), or other equivalent discrete or integrated logic circuitry. Control circuitry 28 can be entirely or partially mounted on one or more circuit boards.

Controller 24 is operably associated with cloud platform 22 to receive the sensed temperature data from cloud platform 22. Controller 24 is operably associated with one or more IoT devices 26 to provide one or more status signals to the IoT devices 26. Controller 24 can be communicatively coupled to cloud platform 22 and IoT devices 26 in any desired manner, either directly or indirectly. Controller 24 includes communications circuitry 30 for sending and receiving data with a remote resource, such as a remote resource included in, e.g., cloud platform 22. Communications circuitry 30 can be configured to facilitate wired or wireless communications. Communications circuitry 30 can facilitate communications over a network, such as cellular networks, wide area networks (WANs) such as the Internet, local area networks (LANs), wireless local area networks (WLANs), or other types of networks. For example, controller 24 can be configured to communicate with cloud platform 22 over a WAN (e.g., the Internet) and can be configured to communicate with IoT devices over a WLAN, among other options.

Memory 32 can be configured to store information before, during, and/or after operation. Memory 32, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 32 is a temporary memory, meaning that a primary purpose of memory 32 is not long-term storage. Memory 32, in some examples, is described as volatile memory, meaning that memory 32 does not maintain stored contents when power to controller 24 is turned off. Examples of volatile memories can include random access memories (RAM), dynamic random access memories (DRAM), static random access memories (SRAM), and other forms of volatile memories. In some examples, memory 32 is used to store program instructions for execution by control circuitry 28. Memory 32, in one example, is used by software or applications running on controller 24 to temporarily store information during program execution.

Memory 32, in some examples, also includes one or more computer-readable storage media. Memory 32 can be configured to store larger amounts of information than volatile memory. Memory 32 can further be configured for long-term storage of information. In some examples, memory 32 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 34 can be configured as an input and/or output device. For example, user interface 34 can be configured to receive inputs from a data source and/or provide outputs the internal temperature. Examples of user interface 34 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

Controller 24 is configured to receive temperature status data from cloud platform 22 and determine a cook status of foodstuff 16 based on the temperature status data. Controller 24 is further configured to generate a status signal and transmit the status signal to one or more of IoT devices 26. The status signal includes commands instructing the IoT device to output a status indicator that provides a notification to the user regarding the determined cook status of foodstuff 16.

IoT devices 26 are computing devices that can transmit and/or exchange data with other devices over a network. The IoT devices 26 can be connected to a local network (e.g., LAN or WLAN) to communication with each other. The IoT devices 26 are communicatively connected to controller 24 to receive status signals from the controller 24. The status signals instruct the IoT device 26 to generate and emit a particular status indicator.

In the example shown, home environment 12 includes multiple IoT devices 26. The IoT devices 26 can be of any configuration suitable for communicatively connecting to a network and generating a status indicator. For example, IoT devices 26a can be lights associated with the structure forming home environment 12, IoT device 26b can be a display, such as a television, and IoT device 26c can be a smart speaker. It is understood that IoT device 26 can be of any desired configuration suitable for receiving commands from controller 24 and providing a status alert regarding the internal temperature to the user. FTM system 10 can be configured to include a single IoT device 26 or multiple IoT devices 26. In some examples, controller 24 is communicatively connected to multiple, different IoT devices 26 (e.g., both IoT device 26a and IoT device 26b) to cause the multiple IoT devices 26 to output status indicators.

In some examples, one or more of the IoT devices 26a can be formed as a multi-hue light. Multi-hue lights are configured such that the IoT device 26 can emit light having multiple different hues. For example, the IoT device 26a can be configured to emit blue light, green light, red light, yellow light, white light, etc.

Controller 24 is configured to receive the temperature status data from the cloud platform 22. Controller 24 is configured to generate cook status data based on the temperature status data received from the cloud platform 22. Controller 24 can be configured to generate the cook status based on a comparison of the temperature status data and one or more temperature thresholds. Controller 24 can classify the cook status of the foodstuff 16 based on the comparison between the temperature status data and the one or more thresholds.

The temperature thresholds can be based on various inflection points in the cooking process. In some examples, the temperature thresholds can be considered to form temperature ranges. The cook status of foodstuff 16 is determined based on the temperature range that the internal temperature of foodstuff 16 falls within. In some examples, the temperature thresholds can be set based on user preference. For example, the user can input the temperature thresholds to controller 24 via user interface 34.

Controller 24 can be configured to generate different status signals for different cook statuses as determined by controller 24. The various status signals can include different commands that cause IoT device 26 to emit different indicators based on the different cook statuses. For example, controller 24 can generate a first status signal based on controller 24 determining that the internal temperature is below a first threshold temperature and controller 24 can generate a second status signal based on controller 24 determining that the internal temperature is above the first threshold. The first status signal can include a first command that causes IoT device 26 to emit a first indicator (e.g., IoT device 26a emitting green light). The second status signal can include a second command that causes IoT device 26 to emit a second indicator different from the first indicator (e.g., IoT device 26a emitting yellow light). The different indicators provide the user with a quick and simple indication of the current cook status of foodstuff 16 without requiring the user to access or locate a notification device. In some examples, FTM system is configured to provide status indicators for multiple, different temperatures of interest. For example, controller 24 can cause IoT device 26a to emit status indicators regarding the internal temperature of foodstuff 16 and controller 24 can cause IoT device 26b to display multiple status indicators regarding both the internal temperature and the exterior temperatures (e.g., inside or outside of cooking device 14). The multiple status indicators are based on temperature reading data generated by multiple temperature sensors 18.

During operation, FTM system 10 generates data regarding the internal temperature of foodstuff 16 and provides status indicators regarding the cook status of foodstuff 16.

An example process is discussed in more detail below in which foodstuff 16 is pork. A first temperature threshold can be set at 155-degrees F. (about 65.6-degrees C.), at about which temperature pork enters a stall. A second temperature threshold can be set at 175-degrees F. (about 79.4-degrees C.), at about which temperature pork exits a stall. A third temperature threshold can be set at 195-degrees F. (about 90.6-degrees C.), a lower temperature for removing from heat, and a fourth temperature can be set at 205-degrees F. (about 96.1-degrees C.), an upper temperature for removing from heat. In the example discussed, the first temperature range is less than the first threshold, the second temperature range is between the first and second thresholds, the third temperature range is between the second and third thresholds, the fourth temperature range is between the third and fourth thresholds, and the fifth temperature range is greater than the fourth threshold.

Foodstuff 16 is placed in cooking device 14. Cooking device 14 generates heat to cook foodstuff 16. Temperature sensor 18 is connected to foodstuff 16, such as by a probe being inserted into foodstuff 16. Temperature sensor 18 generates temperature reading data and outputs the temperature reading data to transceiver 20. For example, the temperature reading data can be based on resistance measurement from a thermocouple of temperature sensor 18.

Transceiver 20 receives the temperature reading data. Transceiver 20 can convert analog temperature reading data to digital sensed temperature data, in examples in which the temperature reading data is analog data. Transceiver 20 outputs the sensed temperature data to cloud platform 22, such as over a WAN, such as the Internet.

Cloud platform 22 receives the sensed temperature data. Cloud platform 22 can generate discrete temperature data points regarding the internal temperature and/or cloud platform 22 can generate a time series plot regarding the internal temperature. Cloud platform 22 stores the information regarding the internal temperature as temperature status data.

Controller 24 receives the temperature status data from cloud platform 22. For example, controller 24 can communicate with cloud platform 22 over a WAN, such as the Internet. Controller 24 compares the temperature status data with one or more temperature thresholds to determine a cook status of foodstuff 16. Controller 24 generates one or more status signals based on the determined cook status. Controller 24 transmits the one or more status signals to one or more IoT devices 26. For example, controller 24 and IoT devices 26 can be connected to a common LAN, such as a wireless LAN, and controller 24 can communicate with IoT devices 26 over that common network. Controller 24 can communicate with cloud platform 22 over a first network and with one or more of IoT devices 26 over a second network. The first network can be different from the second network. For example, the first network can be a WAN and the second network can be a LAN. Transceiver 20 can, in some examples, communicate with the cloud platform 22 over the first network.

The status signal generated and sent by controller 24 includes a command instructing IoT device 26 to generate and emit a status indicator based on the cook status determined by controller 24. The status indicator provides information to the user regarding the cook status of foodstuff 16. IoT device 26 emits the status indicator (e.g., audio, visual, combination of audio/visual, etc.).

Controller 24 first determines that the internal temperature is less than the first threshold based on the temperature status data. In some examples, controller 24 is configured to generate a status signal only when the comparison indicates that a temperature threshold has been met or exceeded. In some examples, controller 24 is configured to generate a status signal based on the comparison regardless of whether the lowest threshold has been met or exceeded. As such, controller 24 can generate a status signal based on a determination that the internal temperature falls below the first threshold. For example, controller 24 can generate a first status signal based on the cook status comparison. The first status signal includes a first command that causes IoT device 26 to emit a first status indicator regarding foodstuff 16. For example, IoT device 26a can emit white light; IoT device 26b can emit a first color from its screen or an audio or visual message; IoT device 26c can emit a first audio message (e.g., a first tone, spoken message, tune, etc.). It is understood that controller 24 can send different status signal communications to each IoT device 26 to cause that IoT device 26 to output a status indicator as desired. It is understood that controller 24 can send different status signal communications to each IoT device 26 to cause the respective IoT device 26 to output a status indicator as desired.

The temperature continues to rise during the cooking process. The comparison indicates that the internal temperature exceeds the first threshold or falls into the second temperature range. Controller 24 generates a second status signal based on controller 24 determining that the internal temperature has risen above the first threshold. The second status signal includes a second command that causes IoT device 26 to emit a second status indicator regarding foodstuff 16. For example, IoT device 26a can emit yellow light; IoT device 26b can emit a second color from its screen or an audio or visual message; IoT device 26c can emit a second audio message (e.g., a second tone, spoken message, tune, etc.).

The temperature continues to rise during the cooking process. Controller 24 generates a third status signal based on controller 24 determining that the internal temperature has risen above the second threshold. The third status signal includes a third command that causes IoT device 26 to emit a third status indicator regarding foodstuff 16. For example, IoT device 26a can emit yellow light; IoT device 26b can emit a third color from its screen or an audio or visual message; IoT device 26c can emit a third audio message (e.g., a third tone, spoken message, tune, etc.).

Controller 24 generates a fourth status signal based on controller 24 determining that the internal temperature has risen above the third threshold. The fourth status signal includes a second command that causes IoT device 26 to emit a fourth status indicator regarding foodstuff 16. For example, IoT device 26a can emit red light; IoT device 26b can emit a fourth color from its screen or an audio or visual message; IoT device 26c can emit a fourth audio message (e.g., a fourth tone, spoken message, tune, etc.).

Controller 24 generates a fifth status signal based on controller 24 determining that the internal temperature has risen above the fourth threshold. The fifth status signal includes a second command that causes IoT device 26 to emit a fifth status indicator regarding foodstuff 16. For example, IoT device 26a can emit blinking red light; IoT device 26b can emit a fifth color from its screen or an audio or visual message; IoT device 26c can emit a fifth audio message (e.g., a fifth tone, spoken message, tune, etc.).

While temperature thresholds are discussed as temperature setpoints, it is understood that not all examples are so limited. For example, one or more temperature thresholds can be based on a rate of change of the temperature over time. As discussed above, the temperature status data can be time series data that plots the internal temperature over time. The time series temperature data provides information regarding the internal temperature trend for foodstuff 16. The temperature threshold can be set based on the internal temperature changing by a certain number of degrees per time period (e.g., greater or less than one degree F. per fifteen minutes; five degrees F. per thirty minutes; etc.). The temperature threshold being based on rate of change can inform the user of the cook status, such as that the foodstuff 16 has entered or exited a stall. As discussed above, the temperature at which foodstuff 16 enters a stall, the temperature at which foodstuff 16 exits a stall, and the length of the stall are based on characteristics of the foodstuff 16 itself and will vary from cook session to cook session and from foodstuff to foodstuff. The stall (entering and/or exiting) can provide an important inflection point during the cooking process that requires some action from the cook. The stall can be determined based on the rate of change of the internal temperature. FTM system 10 facilitates informing the cook as to the stall status (pre-stall, mid-stall, post-stall) based on the rate of change of the temperature as determined from the time series temperature status data.

In some examples, controller 24 can be configured to generate the status signals based on the comparison indicating that the temperature status data satisfies more than one temperature threshold. For example, controller 24 can be configured to generate a status signal to indicate that foodstuff 16 has exited a stall based on the comparison indicating that the temperature status data satisfies both a temperature setpoint threshold (e.g., at least a first temperature) and a temperature rate threshold (e.g., at least a first rate of change).

In some examples, controller 24 is configured to determine that the cooking process has entered a stall state based on the determined rate of change of the temperature. Controller 24 can determine that the foodstuff 16 has entered a stall based on the comparison of the rate of change of the internal temperature and a rate threshold. In one example, controller 24 determines that the foodstuff 16 has entered the stall based on the rate of change being less than a first stall threshold rate of 0.5-degrees F. per thirty minute period. Additionally or alternatively, controller 24 can determine that the foodstuff 16 has exited the stall based on the rate of change being greater than a second stall threshold rate. The second stall threshold rate can be the same as or different from the first stall threshold rate. Controller 24 can generate and output a status signal indicative of the stall based on controller 24 determining the cooking state of the foodstuff 16 relative to the stall. For example, controller 24 can cause IoT device 26 to emit status indicators indicating the foodstuff 16 has entered the stall, is in the stall, and/or has exited the stall, among other options.

Controller 24 can be configured to not generate the status signal based on the temperature status data not satisfying both of the temperature thresholds. Alternatively, controller 24 can be configured to generate a different status signal indicating when the temperature status data satisfies only one of the temperature thresholds. For example, controller 24 can be configured to generate a first status signal based on the temperature status data satisfying the temperature setpoint threshold (e.g., to cause IoT device 26a to emit green light), controller 24 can be configured to generate a second status signal based on the temperature status data satisfying the temperature rate threshold (e.g., to cause IoT device 26a to emit yellow light), and controller 24 can configured to generate a third status signal based on the temperature status data satisfying the temperature setpoint threshold and the temperature rate threshold (e.g., to cause IoT device 26a to emit light flashing between green and yellow).

In some examples, controller 24 is configured to compare the temperature status data to multiple temperature thresholds and generate the status signals based on whichever temperature threshold is satisfied first. For example, the controller 24 can compare the temperature status data to both a temperature setpoint threshold and a temperature rate threshold, and can generate and output the status signal based on the temperature status data satisfying one of the thresholds.

The status indicators are output by IoT devices 26 and provide environmental indicators regarding the status of foodstuff 16. The status indicators inform the user of the cook status of foodstuff 16, allowing the user to take action as needed based on the inflection points in the cooking process.

FTM system 10 provides significant advantages. FTM system 10 generates information regarding the internal temperature of foodstuff 16. Controller 24 is indirectly communicatively connected to transceiver 20 via cloud platform 22. Such indirect communication allows controller 24 to receive the data regarding the internal temperature regardless of the relative positions of transceiver 20 and controller 24. Controller 24 is not required to be within some operational range for direct communication.

Controller 24 provides status signals to one or more IoT devices 26 to cause the IoT devices 26 to output the status indicator for the user. The status indicators are not communicated on a dedicated device. Instead, the status indicators are communicated to the environment of FTM system 10 via IoT devices 26 that have primary purposes other than use in FTM system 10. In the example shown, the status indicators are output by IoT devices 26 in home environment 12. Outputting the status indicators in home environment 12 via IoT devices 26 allows any person in home environment 12 to notice and react to the status indicator (e.g., by the cook reacting or by another person alerting the cook). IoT devices 26 are also configurable in such a way that the status indicators are easily interpretable by persons other than the cook. For example, the person does not need to know the various internal temperature and inflection points to understand that the cook needs to be alerted based on a change in the color emitted by IoT devices 26.

Figure 2:
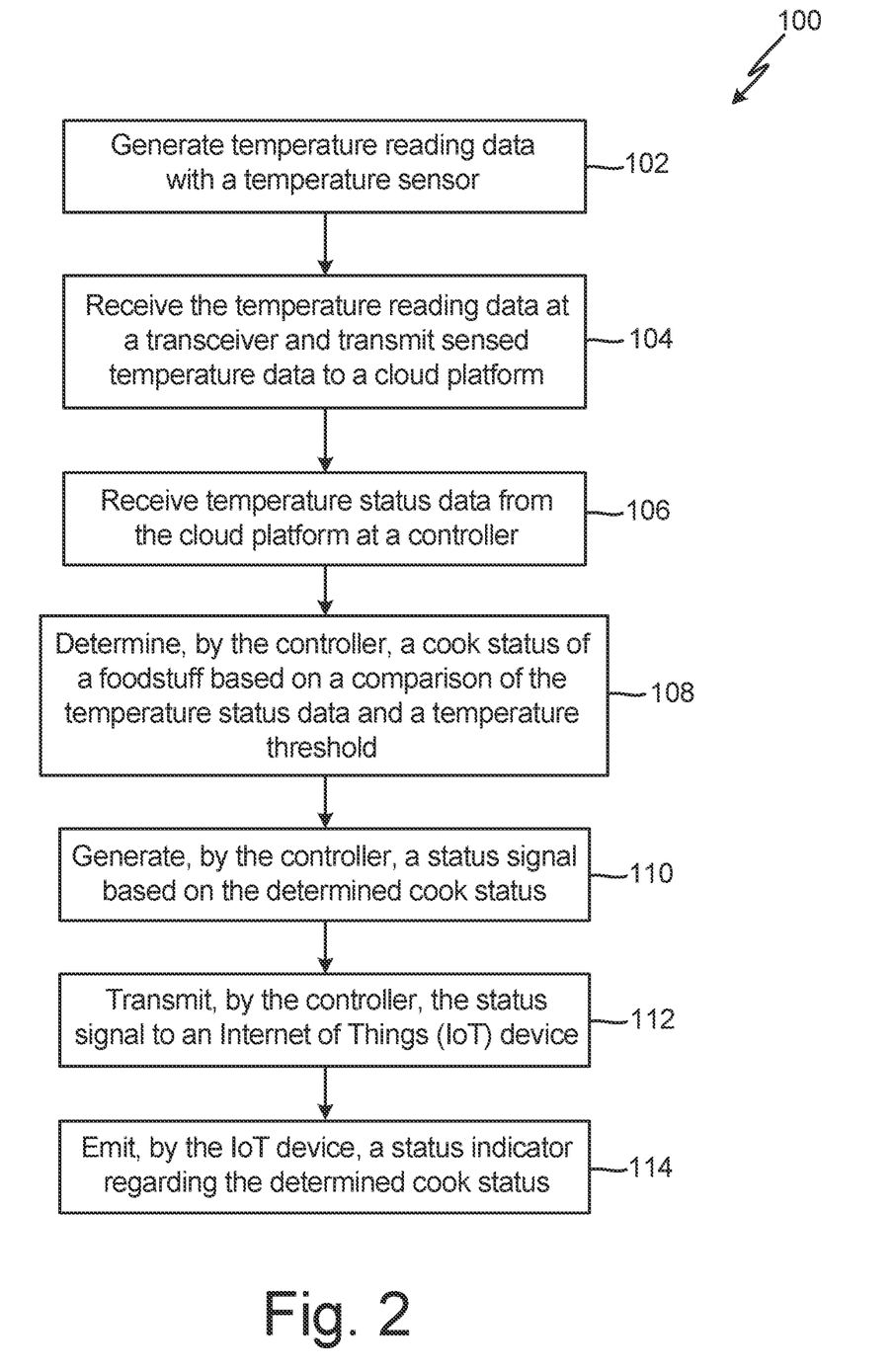
FIG. 2 is a flow chart illustrating a method of monitoring and providing indications regarding the temperature of a foodstuff.

FIG. 2 is a flowchart illustrating method 100 of monitoring and providing indications of the cook status of foodstuff 16. FIG. 2 is discussed with continued reference to FIGS. 1A and 1B. During operation, FTM system 10 generates data regarding the internal temperature of foodstuff 16 and provides status indicators regarding the cook status of foodstuff 16.

In step 102, temperature sensor 18 generates temperature reading data and outputs the temperature reading data to transceiver 20. For example, the temperature reading data can be based on resistance measurement from a thermocouple of temperature sensor 18.

In step 104, transceiver 20 receives the temperature reading data. Transceiver 20 can convert analog temperature reading data to digital sensed temperature data, in examples in which the temperature reading data is analog data. Transceiver 20 outputs the sensed temperature data to cloud platform 22, such as over a WAN, such as the Internet. Cloud platform 22 receives the sensed temperature data. Cloud platform 22 can generate discrete temperature data points regarding the internal temperature and/or cloud platform 22 can generate a time series plot regarding the internal temperature. Cloud platform 22 stores the information regarding the internal temperature as temperature status data.

In step 106, controller 24 receives the temperature status data from cloud platform 22. For example, controller 24 can communicate with cloud platform 22 over a WAN, such as the Internet. Controller 24 can receive the temperature status data via a "push" protocol or a "pull" protocol. The temperature status data can, in some examples, be provided to controller 24 as time series data, among other options.

In step 108, controller 24 compares the temperature status data with one or more temperature thresholds to determine a cook status of foodstuff 16. The temperature thresholds can include temperature setpoint thresholds and/or temperature rate thresholds. For example, controller 24 can recall the temperature thresholds from memory 32.

In step 110, controller 24 generates one or more status signals based on the determined cook status. For example, controller 24 can recall the command associated with a particular cook status and IoT device 26 from memory 32. In step 112, controller 24 transmits the one or more status signals to one or more IoT devices 26. For example, controller 24 can communicate with IoT devices 26 over a common LAN, such as a wireless LAN, to which IoT devices 26 and controller 24 are connected. The status signal provided by controller 24 includes a command instructing the IoT device 26 to generate and emit a status indicator based on the cook status determined by controller 24. In step 114, IoT device 26 emits the status indicator (e.g., audio, visual, combination of audio/visual, etc.).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the present disclosure.

The invention claimed is:

1. A food temperature measurement (FTM) system comprising:
   an Internet of Things (IoT) device configured to provide a visual output;
   a temperature sensor configured to generate temperature reading data regarding an internal temperature of a foodstuff;
   a transceiver communicatively connected to the temperature sensor to receive the temperature reading data from the temperature sensor and transmit sensed temperature data to a cloud platform, the sensed temperature data based on the temperature reading data; and a controller communicatively connected to the cloud platform to receive temperature status data from the cloud platform, the temperature status data based on the sensed temperature data, the controller comprising:
control circuitry; and
computer-readable memory storing instructions that, when executed by the control circuitry, cause the controller to:
compare the temperature status data to a first temperature threshold to determine a cook status;
generate a first status signal based on the determined cook status indicating that the temperature status data is less than the first temperature threshold;
transmit the first status signal to the IoT device to cause the IoT device to emit a first status indicator regarding a cooking state of the foodstuff, the first status indicator being a first visual output;
generate a second status signal based on the determined cook status indicating the temperature status data exceeding the first temperature threshold; and
transmit the second status signal to the IoT device to cause the IoT device to emit a second status indicator regarding a cooking state of the foodstuff, the second status indicator being a second visual output different from the first visual output.

2. The FTM system of claim 1, wherein the temperature sensor includes a thermocouple.

3. The FTM system of claim 1, wherein the temperature reading data is a resistance measurement of the temperature sensor.

4. The FTM system of claim 1, wherein the transceiver includes an analog to digital converter and is configured to convert analog temperature reading data from the temperature sensor into digital temperature data that is transmitted to the cloud platform.

5. The FTM system of claim 4, wherein the transceiver is configured to push the digital temperature data to the cloud platform intermittently.

6. The FTM system of claim 5, wherein the transceiver is configured to push the digital temperature data to the cloud platform at regular intervals.

7. The FTM system of claim 4, wherein the transceiver is configured to push the digital temperature data to the cloud platform at least once a second.

8. The FTM system of claim 4, wherein the digital temperature data is stored as time series temperature data in the cloud platform.

9. The FTM system of claim 8, wherein the temperature status data is the time series temperature data.

10. The FTM system of claim 9, wherein the temperature threshold is a rate of change of the internal temperature of the foodstuff.

11. The FTM system of claim 9, wherein the controller is further configured to:
compare the temperature status data to a second temperature threshold to generate the determined cook status;
generate a second status signal based on the determine cook status; and
transmit the second status signal to the IoT device to cause the IoT device to emit a second status indicator regarding the cooking state of the foodstuff.

12. The FTM system of claim 11, wherein the first temperature threshold is lower than the second temperature threshold.

13. The FTM system of claim 11, wherein the first status indicator is different from the second status indicator.

14. The FTM of claim 11, wherein the IoT device is a multi-hue light, the multi-hue light emits light having a first hue based on the first status signal, and the multi-hue light emits light having a second hue based on the second status signal, the second hue different than the first hue.

15. The FTM of claim 1, wherein the controller is configured to communicate with the cloud platform over a wide area network, and wherein the controller is configured to communicate with the IoT device over a local area network.

16. A food temperature measurement (FTM) system comprising:
an Internet of Things (IoT) device;
a temperature sensor configured to generate temperature reading data regarding a temperature of a foodstuff;
a transceiver communicatively connected to the temperature sensor to receive the temperature reading data from the temperature sensor, the transceiver configured to transmit sensed temperature data to a cloud platform, the sensed temperature data based on the temperature reading data; and
a controller communicatively connected to the cloud platform to receive temperature status data from the cloud platform, the temperature status data based on the sensed temperature data, the controller comprising:
control circuitry; and
computer-readable memory storing instructions that, when executed by the control circuitry, cause the controller to:
compare the temperature status data to a plurality of temperature thresholds to determine a cook status;
generate cook status data based on the comparison of the temperature status data and the plurality of thresholds;
generate a status signal based on the cook status data; and
transmit the status signal to the IoT device to cause the IoT device to emit a status indicator regarding a cooking state of the foodstuff;
wherein the plurality of temperature thresholds includes a first temperature threshold and a second temperature threshold;
wherein the controller is configured to generate a first status signal based on the temperature status data being less than the first temperature threshold, and the controller is configured to generate a second status signal based on the temperature status data being between the first temperature threshold and the second temperature threshold;
wherein the controller is configured to cause the IoT device to output a first status indicator regarding a cooking state of the foodstuff based on the first status signal, the controller is configured to cause the IoT device to output a second status indicator regarding the cooking state of the foodstuff based on the second status signal, the first status indicator is a first visual output, and the second status signal is a second visual output different from the first visual output.

17. A food temperature measurement (FTM) system comprising:
an Internet of Things (IoT) device;
a temperature sensor configured to generate temperature reading data regarding an internal temperature of a foodstuff;

a transceiver communicatively connected to the temperature sensor to receive the temperature reading data from the temperature sensor and transmit sensed temperature data to a cloud platform, the sensed temperature data based on the temperature reading data; and a controller communicatively connected to the cloud platform to receive temperature status data from the cloud platform, the temperature status data based on the sensed temperature data, wherein the temperature status data is stored as time series temperature data, the controller comprising:

control circuitry; and computer-readable memory storing instructions that, when executed by the control circuitry, cause the controller to:

compare the temperature status data to a first temperature threshold to determine a cook status, wherein the first temperature threshold is a rate of change of the internal temperature of the foodstuff;

generate a first status signal based on the determined cook status; and transmit the first status signal to the IoT device to cause the IoT device to emit a first status indicator regarding a cooking state of the foodstuff.

* * * * *